(12) United States Patent
Craig et al.

(10) Patent No.: US 6,757,708 B1
(45) Date of Patent: Jun. 29, 2004

(54) CACHING DYNAMIC CONTENT

(75) Inventors: Ronald E. Craig, Pittsboro, NC (US);
Steven D. Ims, Apex, NC (US);
Yongcheng Li, Raleigh, NC (US);
Daniel E. Poirier, Durham, NC (US);
Soumitra Sarkar, Cary, NC (US);
Yih-Shin Tan, Raleigh, NC (US);
Maria Rita Villari, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/518,474

(22) Filed: Mar. 3, 2000

(51) Int. Cl.[7] .................. G06F 15/16; G06F 13/00; G06F 7/00
(52) U.S. Cl. .................. 709/203; 719/311; 707/10
(58) Field of Search ................ 709/203, 311, 709/213–216, 315–316; 707/10; 719/311, 315–316

(56) References Cited

U.S. PATENT DOCUMENTS

| | | | |
|---|---|---|---|
| 5,897,634 A | * | 4/1999 | Attaluri et al. ............... 707/8 |
| 5,951,680 A | * | 9/1999 | Redlin et al. ................. 713/1 |
| 6,064,406 A | * | 5/2000 | Atkinson et al. ........... 713/100 |
| 6,085,198 A | * | 7/2000 | Skinner et al. ......... 707/103 R |
| 6,249,844 B1 | * | 6/2001 | Schloss et al. .............. 711/122 |
| 6,292,880 B1 | * | 9/2001 | Mattis et al. ................ 711/216 |
| 6,557,100 B1 | * | 4/2003 | Knutson ...................... 713/100 |
| 6,629,135 B1 | * | 9/2003 | Ross et al. ................... 709/218 |
| 2002/0124082 A1 | * | 9/2002 | San Andres et al. ........ 709/225 |

OTHER PUBLICATIONS

Wetherall, D., et al., Active Pages: Intelligent Nodes on the World Wide Web, MIT Laboratory for Computer Science, www.tns.Ics.mit.edu/publications/WWW94b/activepages, pp. 1–8, Mar. 31, 1994.*
Understanding Remote Data Service Applications, Microsoft Corp., www.host-web.fr/iishelp/adc/docs/ad-cdg01_1.htm, pp. 1–8, 1997.*
Rabbani, U., et al., A COSTAR Interface Using WWW Technology, www.amia.org/pubs/symposia/D005064.pdf, pp. 1–5, Sep. 20, 1998.*
JavaServer™ Pages™—Specification 0.92, Sun Microsystems, pp. 1–47, Oct. 7, 1998.*

* cited by examiner

*Primary Examiner*—Andrew Caldwell
(74) *Attorney, Agent, or Firm*—Marcia L. Doubet; Jeanine S. Ray-Yarletts; Jerry W. Herndon

(57) ABSTRACT

A method, system, and computer program product for caching dynamically generated content (including, but not limited to, dynamically generated Web pages), as well as determining when the cached content should be invalidated or purged. Rather than caching the generated datastream (i.e. the end result of the computations used in the dynamic generation process) as in the prior art, the interim results of computations (such as a generated bean instance or object, where the interim results may be stored using properties and methods) are cached according to the present invention. The input properties used to generate the bean or object, along with the input property values, are used to distinguish among cached instances and thereby identify when a cached instance may be used to respond to a subsequent request for the same content. Re-execution of the business logic of the bean or object may then be avoided, using the cached bean's or object's output properties to generate the content response. Application-specific, developer-defined criteria may be used in the cache invalidation determination.

51 Claims, 10 Drawing Sheets

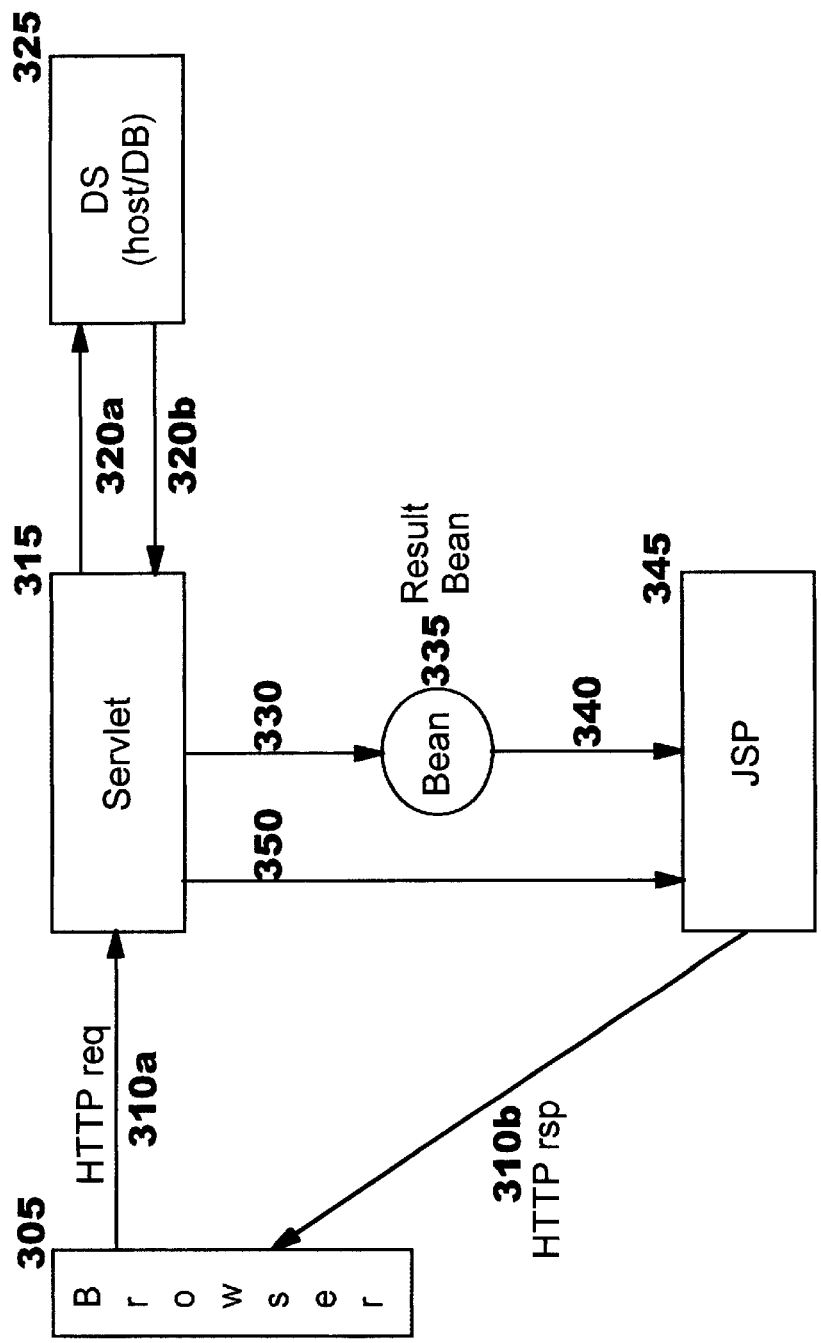

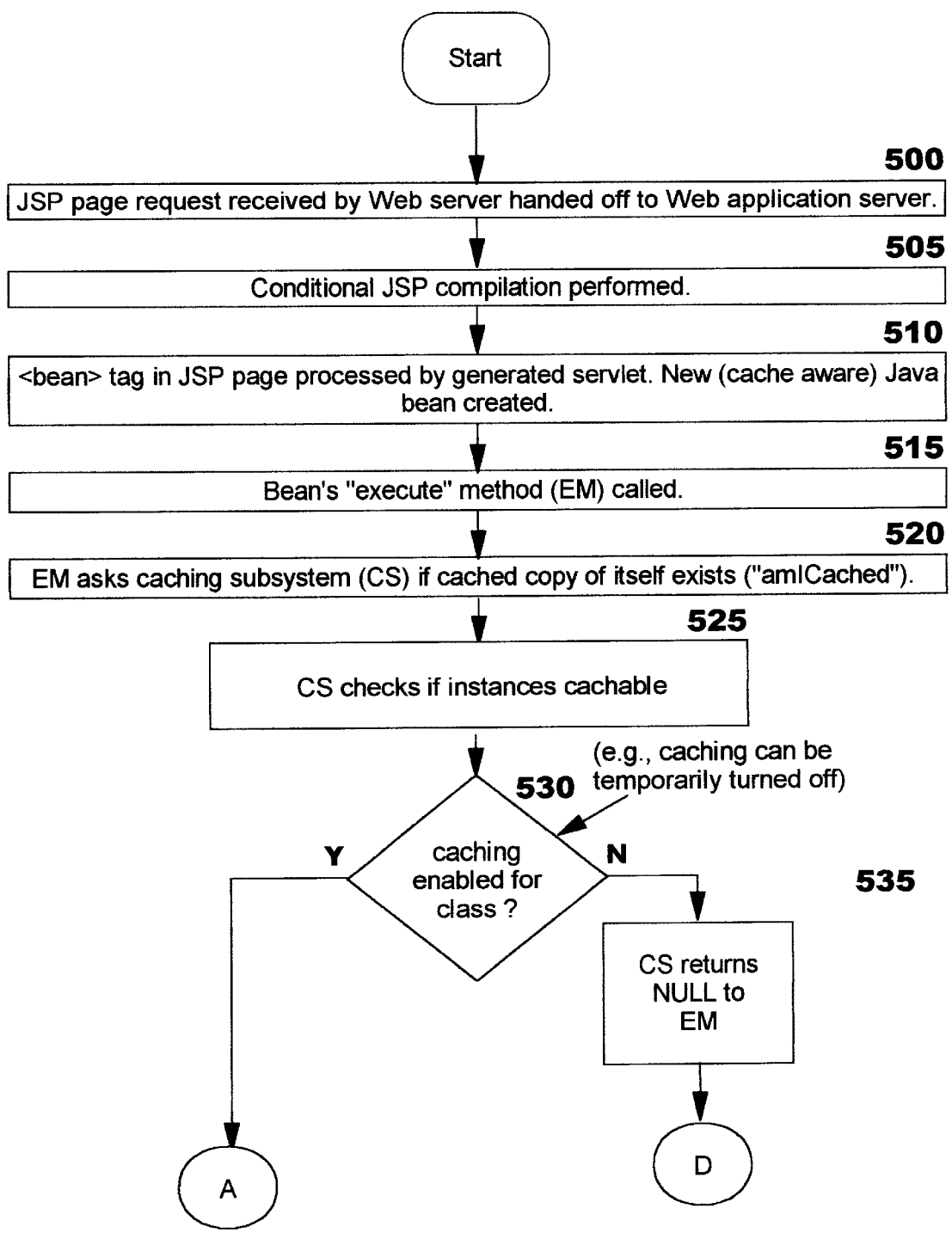

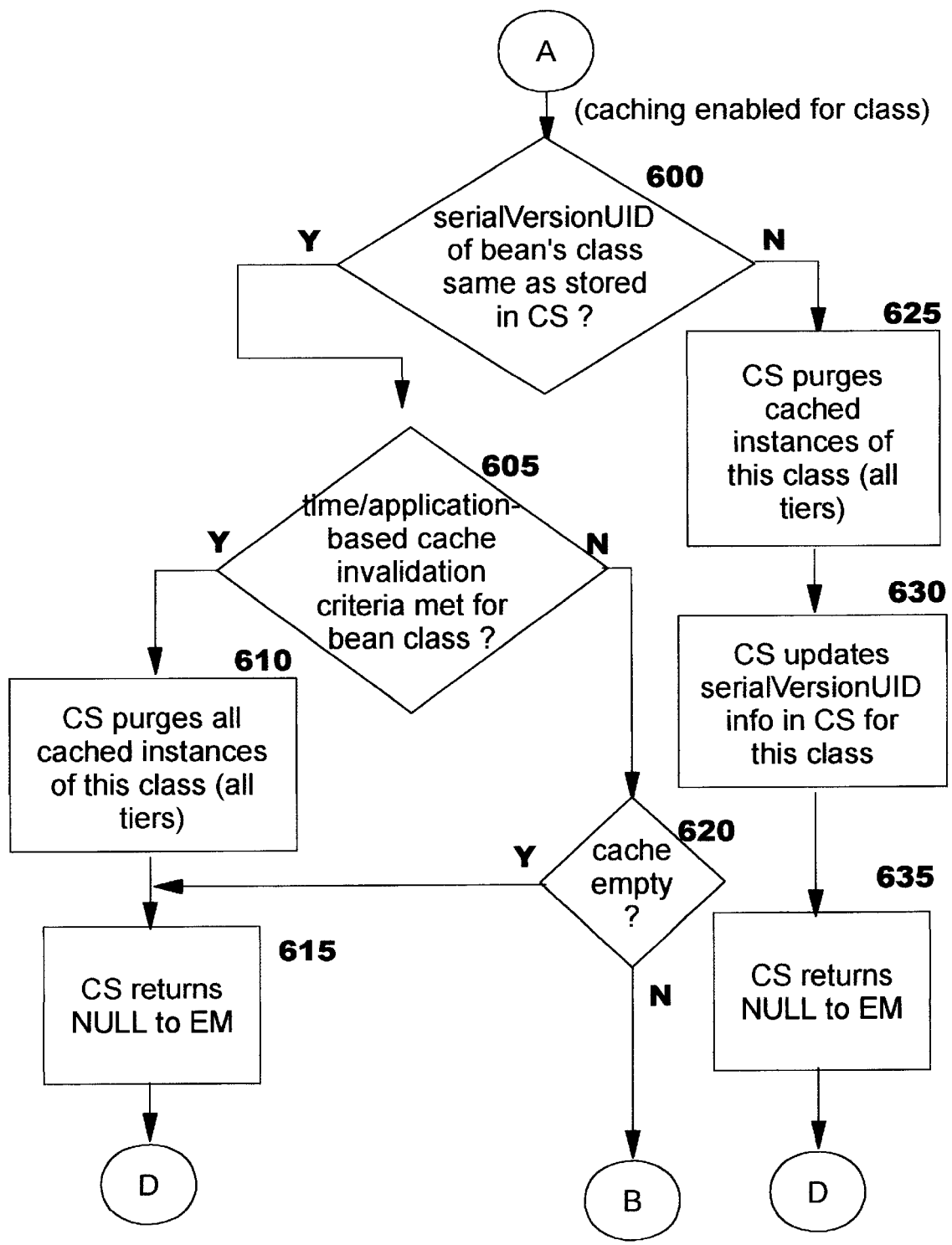

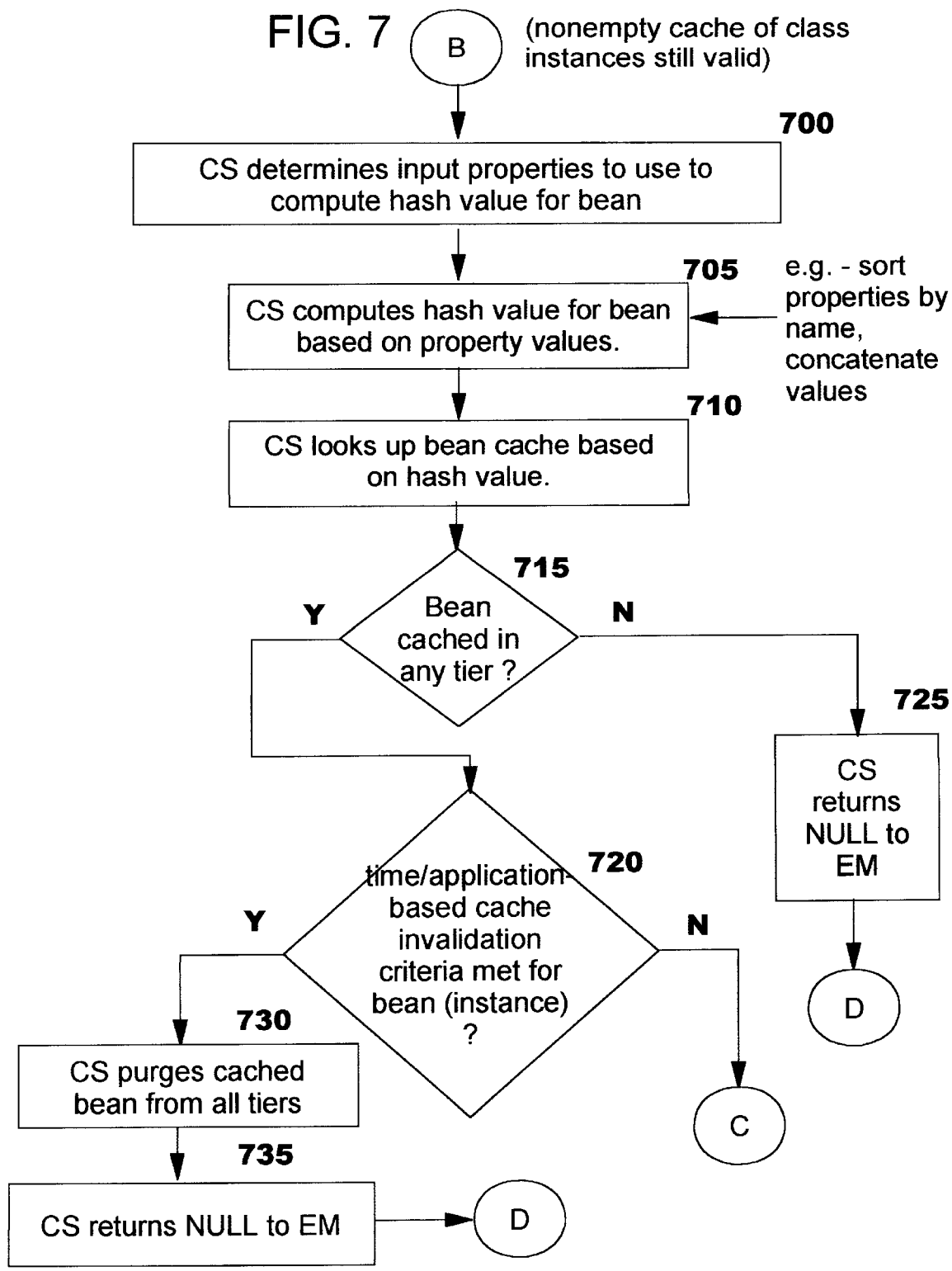

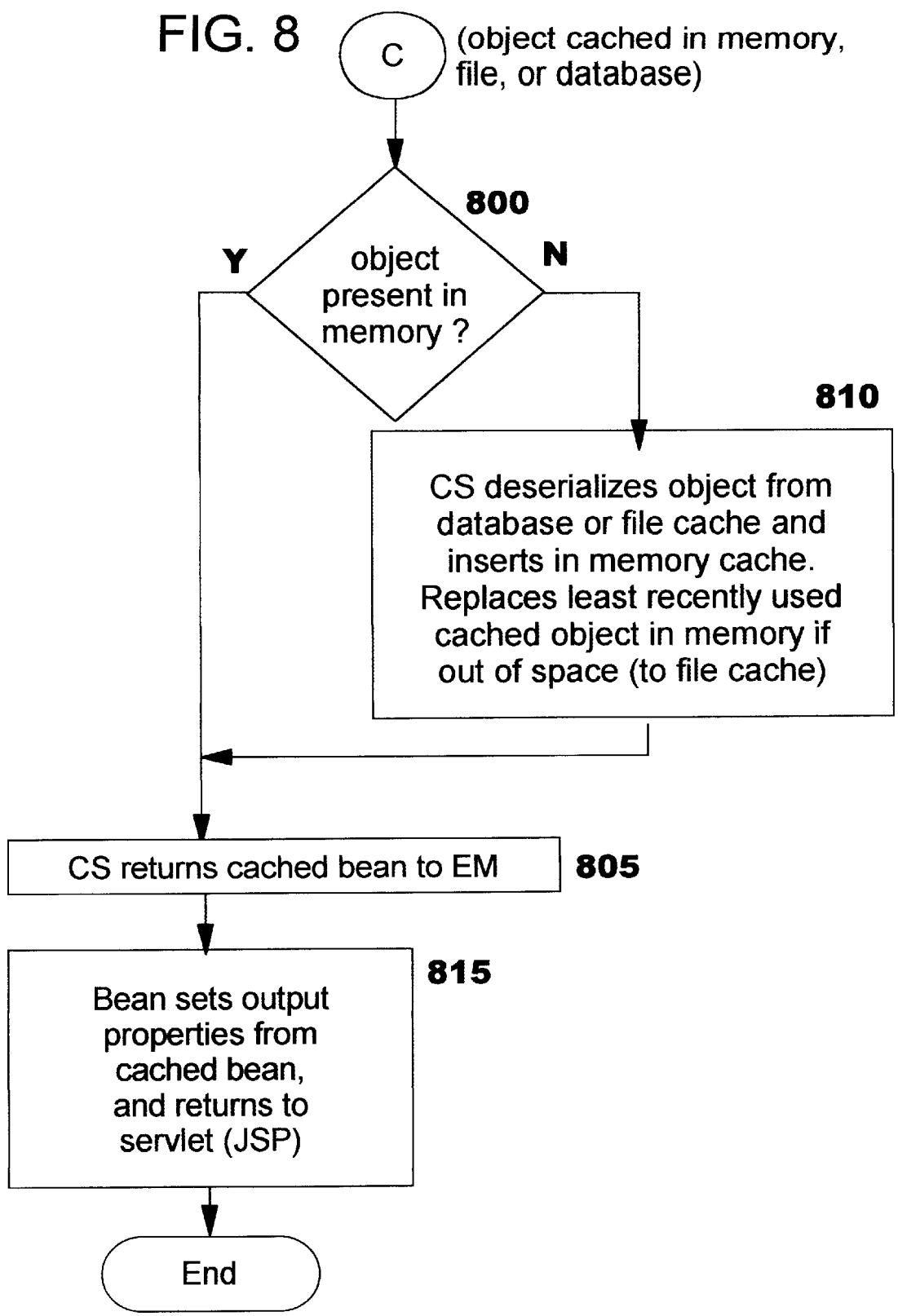

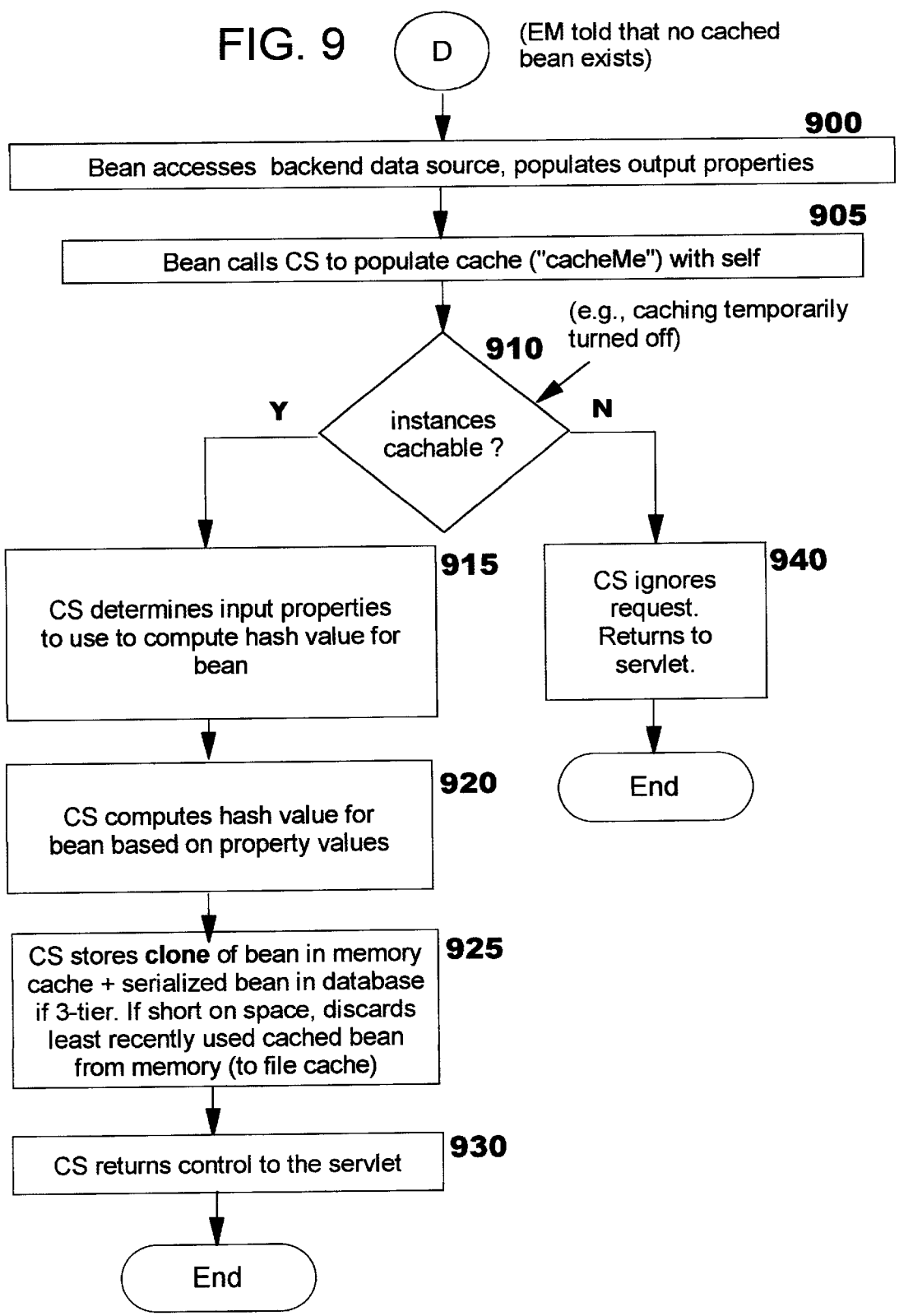

CACHING DYNAMIC CONTENT

BACKGROUND OF THE INVENTION

1. Field of the Invention

The present invention relates to a computer system, and deals more particularly with a method, system, and computer program product for caching dynamically generated content (including, but not limited to, dynamically generated Web pages), as well as determining when the cached content should be invalidated or purged.

2. Description of the Related Art

Techniques are well known for caching static content of files, Web pages, and so forth in order to improve the speed and efficiency of information retrieval. For example, when a user in an Internet environment requests delivery of a static Web page, the page may be initially retrieved from a remote server and then stored in a data store that is locally accessible to the requester's computing device. (Or, in some cases the retrieved page may be stored in a data store of an intermediate server.) Subsequent requests by this user for the same page may be intercepted by a caching system which retrieves the page from this local (or intermediate) data store. In this manner, the system overhead of the round trip to the remote server is avoided, thereby improving the system performance and reducing the response time to the user. On the other hand, subsequent requests for a previously cached Web page may require retrieval of a new version of the page from the remote server, based on the results of a cache invalidation algorithm or process that determines whether the currently cached version has become out of date or stale. The Hypertext Transfer Protocol ("HTTP"), which is commonly used to request and deliver Web pages, provides one such cache invalidation technique wherein the creator of the page content may include a header field value that specifies the date and time when the content expires (that is, when it should no longer be considered valid). File modification timestamps are commonly used for cache invalidation (also referred to as cache refreshing), where a newer timestamp implies that the content of a file has changed and thus should supersede a previously cached version thereof.

With dynamically generated content, the caching of data and the cache invalidation issues are more complex than with static content. At the same time, generation of dynamic content is typically a much slower and more expensive operation (in terms of computing resources used) than retrieval of static content, and thus there are significant performance improvements to be realized with a well-designed dynamic content caching technique.

Dynamically generated Web page content is becoming more prevalent in the Internet environment. One common, simple use of dynamic page content is the "visitor counts" which are often displayed on Web pages, with text such as "You are the 123rd visitor to this site since Jan. 1, 1999" (where the count of visitors is accumulated at the server and inserted into the page syntax before returning the page to the user). Other simple uses of dynamic content include displaying the current date and time on the dynamically generated page. More advanced techniques for dynamic content allow servers to provide Web pages that are tailored to the user's identification and other available information about the user. For example, servers providing travel reservation services commonly store information about the travel preferences of each of their users and then use this information when responding to inquiries from a particular user. Dynamic content may also be based upon user classes or categories, where one category of users will see one version of a Web page and where users in another category will see a different version—even though all users provided the same URL ("Uniform Resource Locator") to request the Web page from the same server. For example, some Web server sites provide different services to users who have registered in some manner (such as filling out an on-line questionnaire) or users who have a membership of some type (which may involve paying a fee in order to get enhanced services, or more detailed information). The difference in dynamically generated content from one generation to another may be as simple as including the user's name in the page, as a personalized electronic greeting; or, the differences may be more significant (such as dynamic content that changes based upon each particular user's past activities at this site). On-line shopping sites, for example, may include a recognition for repeat shoppers, such as thanking them for their previous order placed on some specific day or offering a special limited-availability discount.

A number of techniques exist for providing dynamic Web page content in response to a user request. An early technique is CGI ("Common Gateway Interface") scripts. Application programming interfaces (APIs) for writing plugins were developed to provide efficiency improvements for Web servers. Examples include the NSAPI from Netscape and the ISAPI for the Internet Information Server, or "IIS". Active Server Pages ("ASPs") and JavaServer Pages ("JSPs") were developed to provide even higher-level abstractions for writing logic to generate dynamic content, building on the plugin technology. ASPs are used on Microsoft Web servers to create ActiveX Controls, invoke their methods, and access their properties to generate dynamic content. JSPs may be used to create dynamic content using JavaBeans and in-line Java scripting in a page. ("Java", "JavaServer", and "Java-Beans" are trademarks of Sun Microsystems, Inc.) Another technique is the use of servlets, which are executable code objects that can be dynamically invoked by the Web server to process a user request. Servlets typically perform some specialized function, such as creating page content based on dynamic factors.

Dynamically generated content may reflect the result of extracting information from a backend data store (for example, by issuing complex queries against a database, by invoking a legacy host application, etc.). The Host Publisher software product available from the International Business Machines Corporation ("IBM") is an example of software that may be invoked in response to receiving a user request for Web content, where that content requires invoking a legacy host application or accessing a relational database. The data extracted using the legacy application may then be used to populate the properties of a Java bean, which can subsequently be used to generate dynamic HTML using JSP technology. The generated HTML page may then be transmitted to a user's computer, where it will typically be rendered with a user agent such as a browser. Or, the populated bean may be accessed from a standalone application (e.g. using an Enterprise JavaBean, or "EJB"). Generation of dynamic content in this manner involves a significant amount of processing overhead. Processing the user's content request involves making a connection to the legacy host system, completing a log-on process, navigating among various host screens to extract the pertinent information, and logging off. Similarly, generating content using complex database queries or other legacy data sources is also an expensive, high-overhead process. Retrieving previously-generated information from a cache, rather than generating the dynamic content anew, would make responding to these high-overhead content requests much more efficient.

Content that is dynamically generated may have a different result when the data used in the content creation changes, and/or when any of the application logic used in the creation process changes. On the other hand, depending on the particular data and application logic, such changes might not affect the resulting content. In addition to result differences caused by underlying data and logic changes, other factors may cause the generated content to vary from one invocation to another. One example of this situation is content that is time- or date-sensitive, such as a Web page that contains a time or date value. Another example is content that is designed to vary from one invocation of the page generation software to another, such as a Web page designed to accumulate and display a visitor count. For these types of Web pages, it does not make sense to cache the generated content. Because of the range of factors that may be involved in determining whether generated content changes, and when and how it changes, application-specific considerations must be accounted for in any viable cache invalidation technique when dynamic content is involved.

Prior art techniques exist which provide a dynamic content caching approach wherein a dynamically created Web page is stored along with the values of the HTTP input parameters which were passed with the page retrieval request (and therefore may have been passed to the page generation software). However, it may be necessary to use more factors than just the HTTP input parameters when creating dynamic Web page content. For example, state data is commonly used in Internet applications, where this state data requires special handing to overcome the inherent limitations of the stateless model on which HTTP is designed. Examples of applications which typically require state information are Internet shopping and e-commerce or e-business applications, which have gained tremendous popularity among Internet users in recent years. The Servlet API, which is typically used for creating such applications in the Java programming language, has defined an HttpSession class and methods, and ServletContext class and methods, which—along with mechanisms such as cookies and URL rewriting that enhance the capabilities of the HTTP protocol—enable state data to be maintained over the course of an on-going user session. (It is this state information that enables an Internet user to add items to a shopping cart, for example, thereby building an order transaction from the data communicated in multiple related message exchanges with a remote HTTP server.)

The historical data accumulated in this manner affects the content of a generated page; in the shopping cart example, information such as the number of entries in the cart, the order total, available credit for this shopper, etc., may change with each message exchange. Suppose the shopping program provides a "Display my shopping cart" or "Display my account balance" option to the user. In this case, the parameters sent on the HTTP request are likely to be the user's account number, an order number, or other similar information. If the resulting dynamically generated page is cached with only this type of input parameter being used to determine whether the page has become stale, then subsequent invocations of this same operation (sending the same input parameters), as the user continues shopping, will likely retrieve the result that was created and cached from the first invocation—giving the user an inaccurate response.

While this shopping cart example is pertinent to the Internet and e-commerce applications, it will be apparent that similar concerns exist in other environments and with other applications that generate dynamic content (for example, by issuing complex database queries).

Accordingly, what is needed is an improved technique for caching dynamically generated content.

SUMMARY OF THE INVENTION

An object of the present invention is to provide an improved technique for caching dynamically generated content.

It is another object of the present invention to provide this technique by accounting for application-specific factors in the caching and cache invalidation processes.

Another object of the present invention is to provide this technique for use with dynamically generated Web page content in an Internet environment.

Still another object of the present invention is to provide this technique where the cached content can be made available for use by applications other than the application which created the content.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for caching dynamically generated content. This technique comprises: receiving a request for dynamically generated content; initially processing this request; generating a response to the received request using output properties; and transmitting the generated response. Initially processing the request further comprises: generating an object to process the request; setting one or more input properties of the generated object; executing logic of the generated object, wherein one or more output properties of the object are set as a result of the execution; and caching the executed object along with the output properties.

The technique may further comprise: receiving a subsequent request for the dynamically generated content; determining whether a cached version of the object exists which can be used for creating the subsequently requested content; using the cached version when the determination has a positive result; responding to the subsequent request when the determination has a negative result; and transmitting the subsequently generated response to the subsequently received request. Using the cached version when the determination has a positive result further comprises: retrieving the output properties from the cached version; and generating a subsequent response to the subsequent request using the retrieved output properties. Responding to the subsequent request when the determination has a negative result further comprises: repeating operation of the initial processing; and generating the subsequent response to the subsequent request using the output properties.

Determining whether the cached version of the object exists may further comprise: storing invalidation criteria for a selected class of the objects; evaluating these invalidation criteria; purging the selected class of cached objects when the evaluated invalidation criteria are met; and setting the result of the determination to the negative result if the cached version is thereby purged.

Or, determining whether the cached version of the object exists may further comprise: storing invalidation criteria for a selected instance of the objects; evaluating these invalidation criteria; purging the selected instance when the evaluated invalidation criteria are met; and setting the result of the determination to the negative result if the cached version is thereby purged.

The object may be a Java bean. The input properties may comprise one or more of: (1) a set of Hypertext Transfer Protocol (HTTP) input request parameters; (2) parameters stored in an HTTP session object; (3) parameters stored in a ServletContext object; and (4) information globally available to the executing logic. The received request and the subsequently received request may specify a JavaServer Page. (Alternatively, the received request may specify an Active Server Page.) The property names of the input properties and values thereof may be used as a key to identify the cached bean (or similarly, the cached object). The key may be formed by sorting the property names of the input properties, and concatenating the sorted property names and the values thereof with appropriate separators. The determination of whether the cached version exists may further comprise generating a subsequent key by sorting property names of subsequent input properties and concatenating the sorted subsequent property names and values thereof from the subsequently received request with appropriate separators.

Executing the logic may further comprise accessing one or more data repositories to retrieve information used in setting the output properties.

The cached version may be stored in an in-memory cache. Additional caching tiers beyond the in-memory cache may be used, wherein the additional caching tiers comprise one or more of: (1) a file system, and (2) a database. A plurality of servers may access the cached objects in the database.

Selected ones of the generated instances may not be cachable, in which case operation of caching is bypassed for these selected ones.

A remote application may access the cached objects. This remote application may use, for example, Remote Method Invocation (RMI) technology, Component Object Model (COM) technology, or CORBA (Common Object Request Broker Architecture) technology.

The present invention will now be described with reference to the following drawings, in which like reference numbers denote the same element throughout.

BRIEF DESCRIPTION OF THE DRAWINGS

FIGS. 3A–3B illustrate processing models using JavaServer Pages;

FIGS. 5–9 illustrate flow charts which set forth the logic which may be used to implement a preferred embodiment of the present invention.

DESCRIPTION OF THE PREFERRED EMBODIMENT

Figure 1:
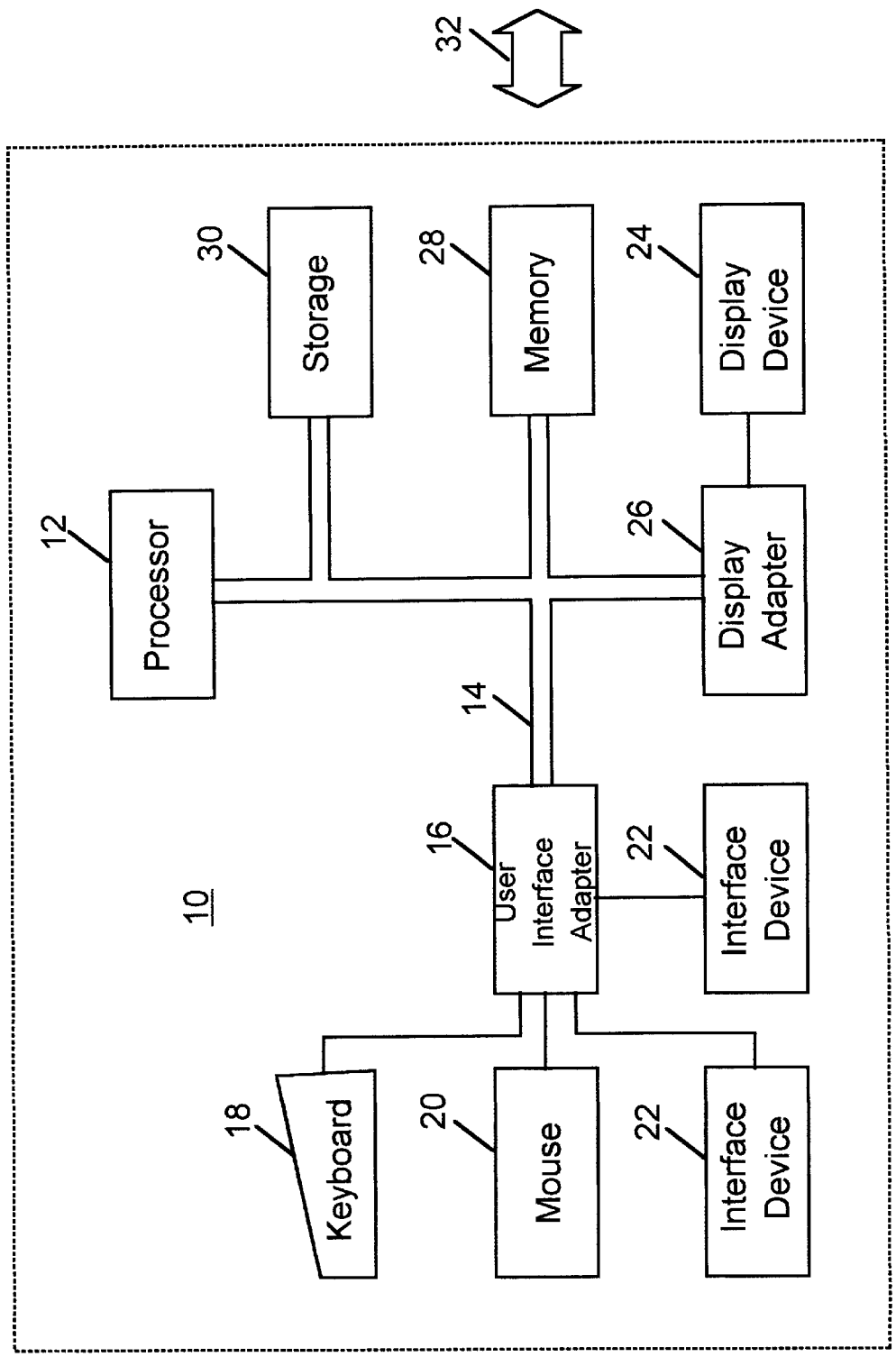
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
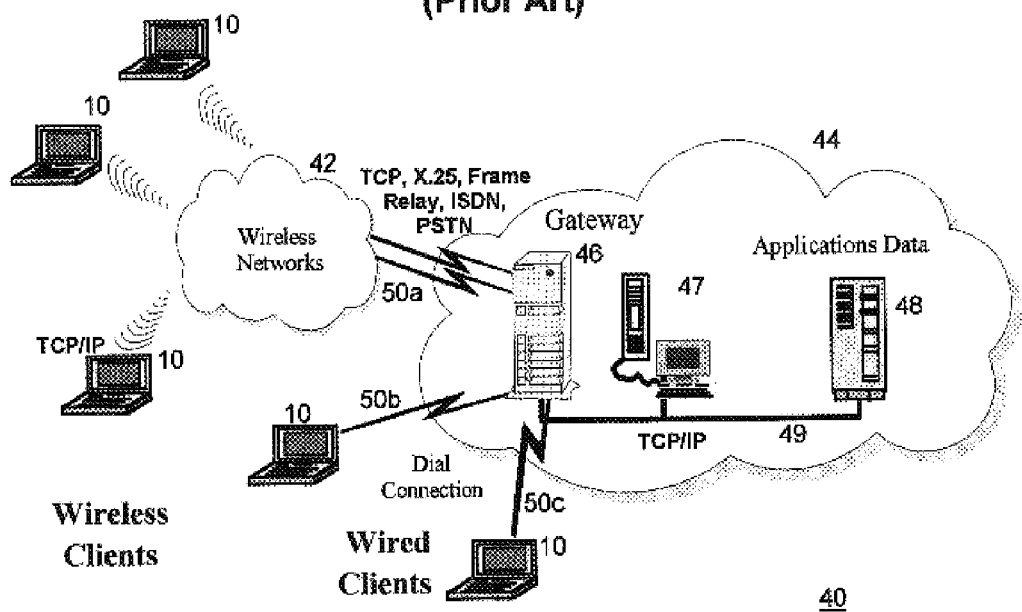
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50*a* such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2. (Note that when the Host Publisher product is used to access legacy host data, the IBM Systems Network Architecture and its protocols are also used within the network. It will be obvious to one of skill in the art how the configuration shown in FIG. 2 is augmented for this situation.)

Software programming code which embodies the present invention is typically accessed by the microprocessor 12 of the server 47 or gateway 46 from long-term storage media 30 of some type, such as a CD-ROM drive or hard drive. The software programming code may be if embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Or, the present invention may be used in a stand-alone mode without having a network connection, whereby operation in this stand-alone mode prepares one or more documents for subsequent transmission. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The implementation of the software of the present invention may operate as one or more modules (also referred to as code subroutines, or "objects" in object-oriented programming) on a server or intermediary device in a network. (In the preferred embodiment described herein, the caching system of the present invention operates on the same device on which the Java beans are executing, using API calls for communicating with the beans. Alternatively, the beans may execute on a different device, and communicate with the caching system over a network using remote API calls.) Or, the software may execute on multiple devices in a distributed manner. (The multi-tiered approach to caching which is described herein, for example, has software executing on multiple devices and sharing cached data in a centralized database. Alternatively, multiple servers may cache data locally and perform the sharing function by defining an update protocol with which updated copies of cached data are exchanged.) An implementation of the present invention may be executing in a Web environment, where a Web server provides services in response to requests from a client connected through the Internet. Alternatively, an implementation of the present invention may be executing in a non-Web environment (using the Internet, a corporate intranet or extranet, or any other network) where cached information is accessed by distributed applications (such as Remote Method Invocation, or RMI, applications; EJBs using RMI or "IIOP", which is the Internet Inter-ORB Protocol; Component Object Model, or COM, when using ActiveX controls; etc). Configurations for the environment include a client/server network, as well as a multi-tier environment. These environments and configurations are well known in the art.

The preferred embodiment of the present invention will now be discussed in more detail with reference to FIGS. 3 through 9.

The present invention provides a novel technique for delivering dynamically generated content to a content requester more efficiently, through use of a caching system and cache invalidation algorithm which are defined herein and which are designed specifically for the dynamic content generation scenario. The preferred embodiment is described herein with reference to content that is dynamically generated in response to a request for a JSP (i.e. a request for a Web page that is specified using JSP syntax). As previously discussed, JSPs are only one of several dynamic content generation scenarios, and thus this description in terms of JSPs is for purposes of illustration and not of limitation. Furthermore, the present invention may be used advantageously for caching intermediate results of computations, where those results are to be used in subsequently generating dynamic content, without regard to the particular format in which those intermediate results have been stored. For purposes of describing the preferred embodiment, the intermediate results are discussed herein as being stored in Java Beans, although other formats (such as objects in object-oriented languages other than Java) may be used alternatively without deviating from the scope of the present invention.

Figure 3B:
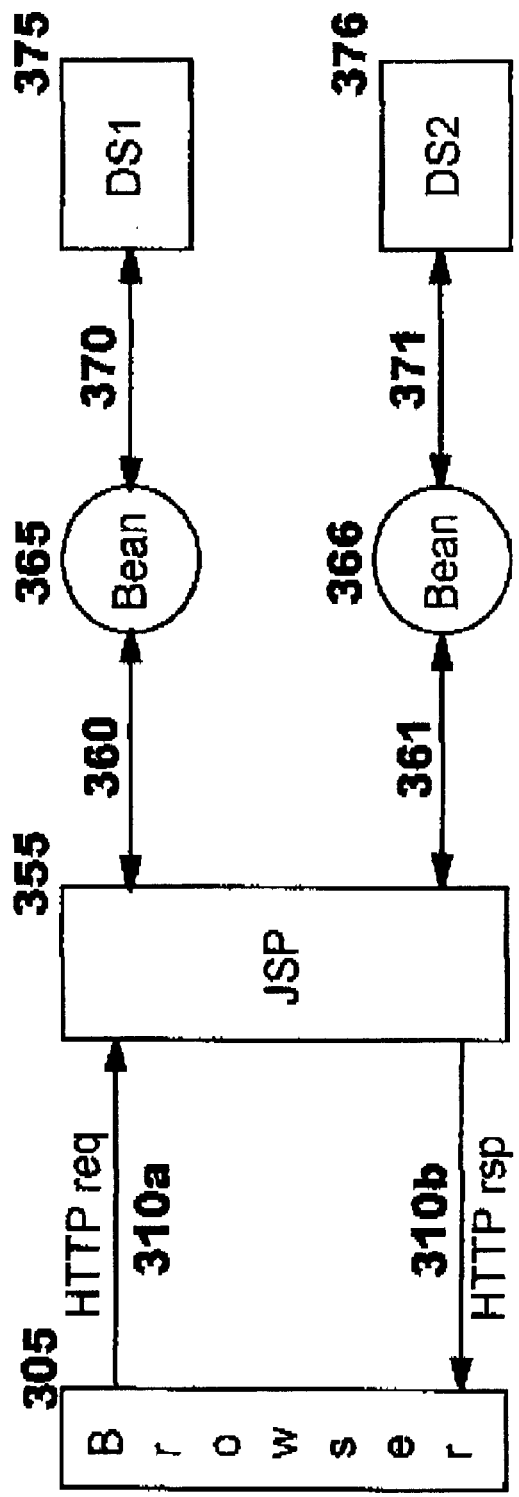

JavaServer Pages enable separating the generation of content from its (visual) presentation. A JSP can include standard markup tags (such as HTML tags, XML tags, etc.), as well as special JSP tags that allow the following actions:

the instantiation of one or more Java beans the invocation of an "execute" method of a bean, which may cause backend data sources to be accessed, complex computations to be performed, and properties of the bean to be populated as a result the inclusion of the values of bean properties as content within the markup tags of the generated output document the execution of arbitrary Java statements and expressions The Java bean(s) referenced by a JSP may be used according to one of two models. First, a referenced bean may simply be a passive container for data (i.e. the bean does not perform any computations), in which case a servlet contains the logic to generate the data used as the JSP's output. This model is illustrated In FIG. 3A. Browser 305 issues an HTTP request 310*a* for a Web page. Servlet 315 receives this request, and as the servlet executes it requests 320*a*, 320*b* data from a data store 325 (such as a database, a legacy host, or a transaction processing system such as IBM's CICS® system). The servlet execution also sets 330 properties of a result bean 335 and passes 350 information to the JSP 345. The JSP 345 may get information from the properties of bean 335, as shown at 340. The dynamically generated response is then returned 310*b* from the JSP 345 to the browser 305. In a second model, a referenced bean my contain an "execute" method which includes the logic to access backend data sources, for example, and set output property which can be used to generate the JSP's output, in which case it is not necessary to have an additional servlet. This model is illustrated in FIG. 3B. Again, browser 305 issues an HTTP request 310*a*. In this second model, the request 310*a* is received by a JSP 355, which controls the processing of the response without use of a separate servlet. JSP 355 in this example takes use of two beans 365, 366 (although in general a JSP may access any number of beans), each of which may access one or more data stores such as 375, 376. For each bean, the JSP first sets the bean's input properties, calls its "execute" method and then gets information by accessing the bean's output properties. Thus, FIG. 3B shows that the JSP 355 sets and gets 360, 361 information from each bean 365, 366, where this information may be a result of the bean retrieving 370, 371 information from the data store 375, 376. Once the dynamically generated response is complete, it is returned 310*b* from the JSP 355 to the browser 305.

The preferred embodiment will be described in terms of the second JSP model (FIG. 3B). It will be obvious to one of ordinary skill in the art how the described function may be altered for use with the first JSP model (FIG. 3A).

JSPs allow a domain expert to develop the JavaBeans for extracting information from the backend data sources. The bean developer then communicates with the Web page designer as to what input properties of the bean must be set before the Web page invokes the bean's function, as well as the bean's output properties that will result from the bean executing, where the value of these output properties can then be embedded within the resulting Web page as dynamically generated content. JSPs are compiled into servlets the first time the JSP is accessed (or when modified), and subsequent accesses then result in executing the previously-compiled servlet code. (Elements 345 and 355 of FIGS. 3A and 3B thus represent the servlet corresponding to the JSP.)

As previously stated, solutions for caching static content are well known, and typically involve using file timestamps to perform cache invalidation (such that modification of the underlying file results in a new file timestamp, causing the previously-cached version to be purged). This technique is inadequate for caching dynamically generated content, however, as additional dependencies are involved. As also stated previously, existing techniques for caching dynamically generated content are known which cache the generated content along with the HTTP input parameters which were used when requesting that content. Because dynamically generated content may be affected by a number of other factors, however, this existing technique may result in returning cached results in situations where the content should have been generated anew. In the case of JSPs which operate according to the second JSP model described above, input data that is used to set the input properties of the executable bean may come from parameters of the HTTP request, state information stored in the HttpSession object, the ServletContext object, or other globally-available information that may be available as the JSP is executing. (Similarly, input information used in the first JSP model may come from a variety of sources such as these.) Thus, additional information beyond the HTTP input parameters is needed for distinguishing among versions of cached information (and for thereby determining whether a cached version is suitable), and a cache invalidation technique needs to be capable of considering whether changes have been made to any of these data sources. In fact, depending on the contents of a particular page and how those contents are (dynamically) generated, it may not be desirable to cache the page at all. As simple examples, pages which display a current time of day or time-sensitive data (such as real-time stock quotes) or a constantly-incremented value such as a visitor count will not be accurate if a cached version of the page is used. (Depending on how the dynamic information is created, however, it may still be possible to benefit from the caching technique disclosed herein. For example, if the data that varies between pages is created from scripting code that is part of the JSP itself, while data retrieved from a backend data source is also used in generating the dynamic page content, then caching that retrieved data may yield significant performance improvements because the backend data access can be avoided even though the scripting code re-executes.) There may be many factors that the content developer feels are necessary to determine when the dynamically generated content of a particular page should be invalidated. Thus, in addition to considering the above-described factors, it is also desirable to enable cache invalidation to be controlled using application-specific criteria which may vary from one data source to another.

The present invention solves these concerns by caching the Java Beans that are produced as a result of a JSP access, rather than trying to cache the generated datastream. This solution is adaptable to any JSP engine and any Web server, as it does not require any non-standard tags to be added to the JSPs to enable the caching process to operate. Caching the beans is a very powerful solution as well, because it makes many types of changes to the JSP file (such as syntax changes to the markup tags into which the content will be embedded) transparent and therefore irrelevant to the invalidation determination. (For example, with prior art dynamic caching of the generated datastream, if the content of the JSP is modified in any way, including merely changing the syntax of a static tag, then the JSP no longer corresponds to the JSP that was used to create the previously-cached datastreams, and these previously-cached datastreams will therefore become invalidated. In the solution of the present invention, the tags (using HTML, XML etc.) are generated each time the page is to be returned to a requester, using cached data from the bean(s) as tag values, and thus changes of this type do not result in invaliding the cached beans. Similarly, if the JSP file is changed to include additional or fewer tags and tag values, the present invention automatically adapts to those changes without impacting the caching process.)

The solution to dynamic content caching defined herein seeks to avoid the cost of executing the business logic of the bean (that is, the logic that is executed upon invoking the bean's "execute" method), by using the previously-cached execution results which are stored as the bean's output properties. This solution does not, however, eliminate the steps of instantiating the bean and working with its property values (as will be described in more detail below with reference to how the preferred embodiment operates). Therefore, the invention is most advantageous when the cost of executing the bean's business logic is high, such as the scenarios of legacy host access and complex database query execution which have been discussed.

Figure 4:
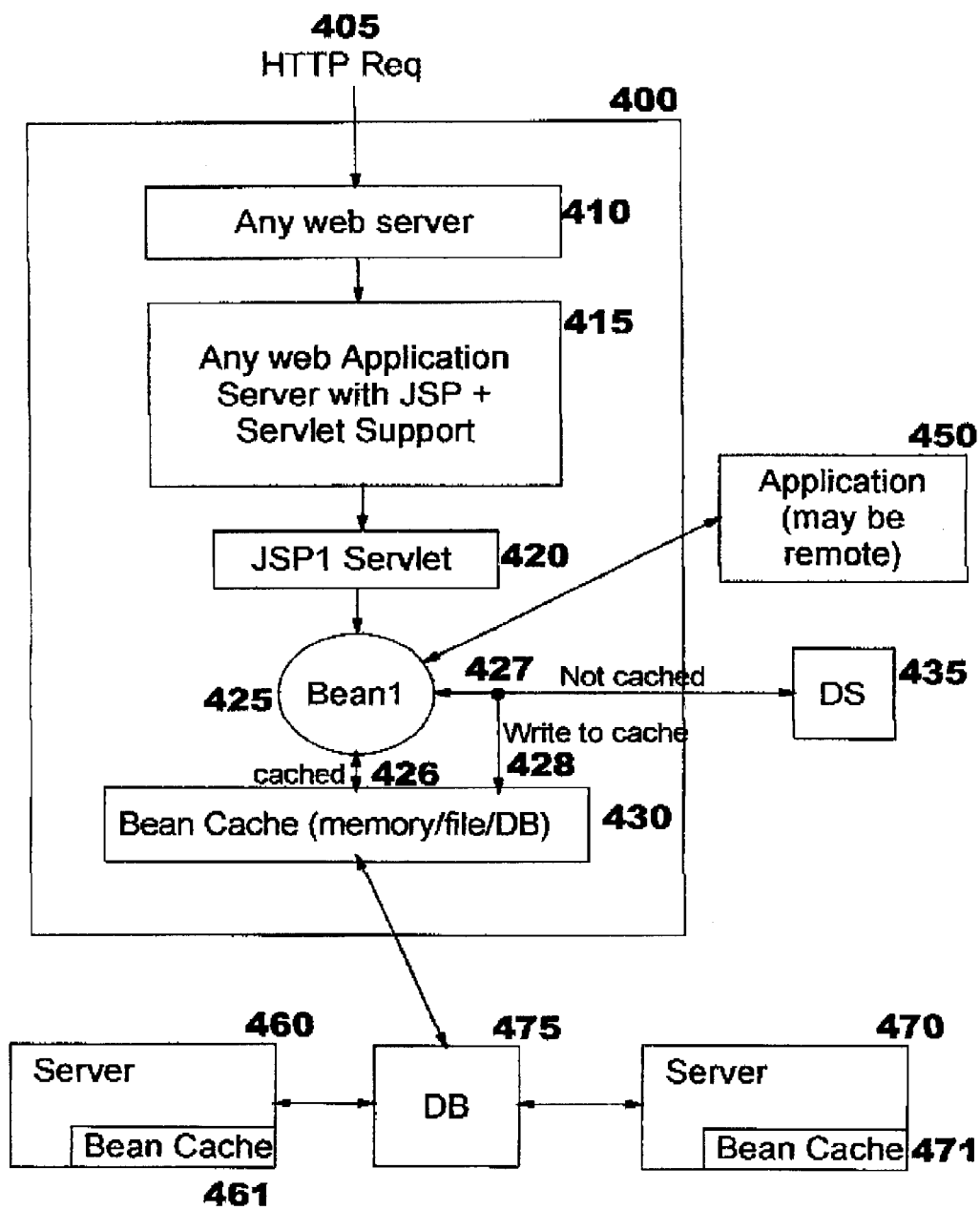
FIG. 4 illustrates a flow of information between components in a preferred embodiment of the present invention.

FIG. 4 depicts the flow of information between components in a preferred embodiment of the present invention as a request for dynamically generated page content is received, and the caching system defined herein determines whether cached information is available to use in the response. A request 405 for dynamically generated content is received at Web server 410, and is then forwarded to a Web application server 415 that is capable of fulfilling the request (and which supports JSPs and servlets). The request is then passed to a servlet 420 corresponding to the invoked JSP, where this servlet 420 uses a bean 425. The caching system determines whether a cached version of the bean (having already set its output properties) is available in bean cache 430. If so, the cached information is retrieved 426 and used in responding to request 405. Otherwise, when there is no cached bean (or when the cached bean information is determined to be stale), the bean's logic will be executed. This execution typically involves accessing one or more data stores 435. The generated information may then be stored 428 in the bean cache 430, where it may be retrieved for use with a subsequent request for dynamic content. (Note that bean cache 430 may be a multi-tier cache, as will be described in more detail below, wherein the cached bean instances may exist in one or more of: an in-memory cache, a file system, or a database. In this case, the reads and writes described with reference to FIG. 4 may involve multiple data stores.)

FIG. 4 also illustrates the capability for multiple servers 460, 470, to each maintain its own local bean cache 461, 471, and also to share cached information stored in a central repository 475 (such as a database). This is beneficial, for example, when redundant servers are provided for failover situations, or for load balancing purposes. By sharing cached beans among the multiple servers, the efficiencies that may be gained through use of the present invention increase, as a request received at one server (such as server 410) may be able to be fulfilled using the cached bean which was stored in repository 475 after being generated from a request processed by another server (such as server 470). FIG. 4 also illustrates another advantage of the caching technique of the present invention, whereby cached bean contents may be used by an application 450 outside the typical environment in which a bean 425 is accessed from a JSP, enabling the application 450 to bypass execution of the business logic performed by the bean 425 and thus improving the application's performance. The application 450 may be a simple "bridging" program whose sole purpose is to allow remote access to the (potentially cachable) bean(s), using remote access technologies such as RMI, CORBA (Common Object Request Broker Architecture), etc. Or, in cases where a bean has been designed to be remotely accessed using such technologies, then application 450 may simply be a remote (RMI, CORBA, etc.) client. Application 450 may also be an EJB which accesses bean 425.

The flowcharts in FIGS. 5 through 9 illustrate logic that may be used to implement a preferred embodiment of the present invention.

The process begins at Block 500 of FIG. 5, where a request for a dynamically generated page is received by a Web server, and then may be passed to an application server (if the receiving server is a load-balancing server, for example, and does not directly process incoming requests). The JSP may be compiled into a servlet, as indicated by Block 505, if a previously-compiled servlet for this JSP is not already available. (Note that this conditional processing is defined in the prior art.) Upon encountering a "<bean>" tag in the JSP, the generated servlet may instantiate a new bean (Block 5 10) that is defined according to the present invention. (Depending on the "scope" attribute on the <bean> tag, a new bean may be instantiated or a previously-instantiated bean might be reused. For purposes of the present invention, it is not significant whether the bean used in: the following discussions has been newly instantiated. What is required is that the caching information described herein is defined for use with the bean.)

The beans to be used by the preferred embodiment of the present invention comprise logic in the bean's execute method to: (1) call a method (referred to herein as "amICached") upon invocation; and (2) call a method (referred to herein as "cacheMe") upon completion of executing the bean's business logic. (Each bean also sets its output properties after executing the business logic, as in the prior art.) Furthermore, each bean (or bean class) knows which bean input properties (reflecting various input parameters) are to be used in the cache lookup algorithm, depending on the processing that is performed by this particular bean (or beans of this class). The input properties are preferably one of the following: (1) the complete set of all the bean's input properties (that is, those properties which support "getter" accesses, where this information can be determined using class introspection techniques known in the art); or (2) some particular subset of the bean's input properties, whose names have been specified in (i) a BeanInfo object (and can therefore be retrieved by accessing the BeanInfo object); (ii) a Java Property object which has been written to a file using a naming convention which ties it to that bean type; or (iii) a bean class or instance method which returns the subset of property names when invoked. In these cases where a subset of properties is used, after locating the property names using any of the techniques described, class introspection (or an equivalent technique) is then used to determine the property values. Other techniques, such as a lookup table or configuration file of bean types and corresponding input property names, may also be used alternatively without deviating from the scope of the present invention. (When the present invention is used with an object-oriented non-Java programming language which may not support class introspection, then the pertinent input properties are preferably determined by defining a method which returns the cache lookup key. This requires the object to implement a method for returning its key value, as well as logic for computing the key value from the appropriate properties.) Note that once the applicable properties for a particular bean class have been determined, they may be remembered by the caching system (hereinafter, "CS") for use with subsequent requests for beans of that class. In this case, the remembered properties may be used when determining the property values for each requested bean.

The existing bean attribute "serialVersionUID" is preferably used with the present invention to signal that the bean's class definition (and thus, possibly its backend data source access logic and input or output properties) or other information that the logic of the bean depends on has been modified, and that any cached beans which are instances of this bean class should therefore be invalidated. In the prior art, this attribute is used to determine whether the source code of the bean class has been changed, thereby invalidating instances (objects) created from an older version of the class which may have been serialized (i.e. saved) to a file. The value of this attribute can be controlled by the developer, according to the prior art, to force a Java class to be considered as a new version even if the built-in versioning logic in the compiler would not treat it as a new version. According to the present invention, the value of this attribute is changed in a function-dependent manner using these known techniques. For example, suppose the business logic of the bean invokes a screen-scraping macro for accessing legacy host application data. If the macro is changed, the data that is returned to the bean may be affected, and thus this macro change needs to be accounted for in the cache invalidation algorithm. Because the bean's own logic has not changed, the compiler will not automatically change the serialVersionUID value. However, the attribute value can be altered (for example, simply by incrementing its value) to force the cached beans to be invalidated based upon knowing the impact of other changes upon the bean's processing result. The preferred embodiment will detect the altered value of SerialVersionUID, and cause any cached bean instances for the affected class to be invalidated (as will be described in detail below). The bean's logic will then be executed again, invoking the new version of the macro. Many development environments (such as the Studio function in IBM's Host Publisher product) enable developers to specify dependencies among components such as the bean and macro in the example just discussed. When this type of support is available, it can be used to automatically generate the changes to the serialVersionUID upon detecting a change in a dependent component. Examples of other component changes, in addition to changes in the bean or its class, that may be relevant in setting this attribute include changes to the underlying data source which would cause changes in the process required to interact with the backend data store, etc. (such as changes to the format of tables in a relational database, indicating that all cached beans which used the previous format should be purged). (As will be obvious to one of ordinary skill in the art, the types of changes that are pertinent depends on the processing implemented by a particular bean.) When the present invention is used with a non-Java object-oriented programming language where the serialVersionUID concept is not available, then an alternative technique may be used to provide this information. For example, a class method may be defined which reports the class version, based on a class property which is part of the source code.

Returning now to FIG. 5, after the cache-aware bean is created at Block 510, the execute method (referred to hereinafter as "EM") of the bean is then invoked (Block 515). As discussed above, this EM begins by asking the CS if a cached copy of itself already exists (Block 520), where this is preferably accomplished by invoking the "amICached" method of the CS.

Upon invocation of the "amICached" method, the CS checks if instances of this bean's class are cachable (Block 525). (Note that an implementation of the present invention may enable caching of a particular bean class to be temporarily turned off using a caching system-specific administrative operation. For example, a list of classes and their caching status may be displayed to an administrator through an administrative interface, which then allows the administrator to toggle one or more of the settings.) Block 530 then checks the result of this test. When this test has a negative result, the CS returns a null or negative response to the EM (Block 535), after which processing continues at Block 900 of FIG. 9. Otherwise, when caching is enabled, processing continues at Block 600 of FIG. 6.

Control reaches Block 600 of FIG. 6 when caching is enabled for the bean class. Block 600 tests whether the serialVersionUID (discussed above) of the bean's class is the same as the value which is stored in the CS. The CS checks class-level cache invalidation criteria for each class, where the criteria comprises one or more of the following: (1) modification of the bean class, and/or other components on which the bean is dependent, using serialVersionUID; (2) time-based criteria (which may be stored as a property of the BeanInfo object, as a class or instance variable, as a class or instance method, in a per-class configuration file, etc.); or (3) other types of applicant-dependent criteria (which may be stored as a class or instance method). As an example of time-based criteria, it may be known that a data source used for a particular bean class is refreshed at midnight every night. Thus, the CS can use this information to determine that any instances of that bean class cached from the previous day are to be considered invalid. Application-dependent criteria may be used, for example, to dynamically query a data source to determine whether any unscheduled content updates have been performed, or by performing other application-specific logic, thereby adding a great deal of flexibility to the CS.

If the test in Block 600 has a positive result, then no change in the bean logic or related files has been detected. Processing therefore continues at Block 605, which tests whether the time-based invalidation criteria and application-dependent criteria (as applicable) are met with regard to the bean class. (Note that the CS may store information about the invalidation criteria locally, after having determined it the first time for a particular class.) If so, then Block 610 purges any cached instances of this class. (For cache invalidation criteria which are defined on a per-bean basis, see Block 720 of FIG. 7.)

A multi-tier caching strategy may optionally be used with the present invention, whereby beans may be cached in memory, in files (as serialized objects) which are locally accessible to the CS, or in a data store such as a database (which may require a network round trip for access by the CS). Aging algorithms are preferably used with this multi-tier strategy, where the least recently used bean is aged out from memory to file storage, for example when the allocated memory becomes full. Such algorithms are known in the art, and will not be described in detail herein. File storage may also be used for increasing system reliability, whereby a redundant copy of the beans cached in memory is stored in the non-volatile file system. (When using a file system tier, the cached objects which are in the in-memory cache are preferably written to the file system when the caching server is being shut down, using techniques which are known in the art and are therefore not described herein.) By storing a copy of cached beans in a remote database, multiple servers may be able to access previously-cached bean versions and achieve greater overall system efficiencies, as has been discussed with reference to FIG. 4. Any combination of these multiple tiers may be used with an implementation of the present invention (including a single tier, which is preferably the in-memory cache). When this multi-tier approach has been used, Block 610 purges not only those instances cached in memory, but also the instances existing in any of the other tiers.

If the time/application-based invalidation criteria are not met (a negative response at Block 605), then Block 620 checks to see if the cache is empty (for example, because no instances have been cached yet, or because the instances have been purged). If not, processing continues to Block 700 of FIG. 7. When the cache is empty, or when the cached instances have been purged by Block 610, Block 615 returns a null or negative result to the CS, after which control transfers to Block 900 of FIG. 9.

Returning to Block 600, when this test has a negative result, then something involved in processing the bean's business logic has changed, indicating that the cached instances for this class should not be considered valid. Accordingly, Block 625 purges all cached instances, including those which may exist in multiple tiers. Block 630 then updates the serialVersionUID value maintained by the CS for this class, setting it to the same value as the current serialVersionUID of the bean's class (which will enable Block 600 to have a positive result on a subsequent invocation). Block 635 then returns a null or negative result to the EM, and control transfers to Block 900 of FIG. 9.

Processing reaches Block 700 of FIG. 7 when a non-empty cache of valid class instances exists. At Block 700, the input properties which are used to identify versions of cached beans are determined (for example, by accessing the BeanInfo object, bean method, or other storage mechanism which indicates the applicable input properties for this class, as previously discussed). According to the preferred embodiment, a hash value is computed over the input property names and their values, and this hash value is then used as a key to store and retrieve the corresponding bean instance. A number of hashing techniques may be used to compute this key value. In the preferred embodiment, the hashing technique comprises sorting the input properties by property name, and then concatenating the sorted property names and their values (with appropriate separators). (By first sorting the property names, this approach avoids inconsistent results that might otherwise occur if different bean instances identified their applicable input properties in different orders.)

The selected hashing technique is performed (Block 705), and the resulting hash value is used (Block 710) to look in the bean cache for a cached instance which has this key value. Thus, it can be seen that the complete set of pertinent input properties is used to distinguish among cached bean instances, and thus to locate a cached bean having output properties that were generated from this set of input properties. If the cached instance is found in any tier of the caching system, then Block 715 has a positive result and processing continues at Block 720.

After Block 715 determines that a cached bean instance is available, Block 720 checks whether the time-based invalidation criteria and application-dependent invalidation criteria, as applicable, are met with regard to this bean instance. (As an example of this situation, invalidation criteria may specify that each cached instance of a particular class is to be purged after the bean has been cached for 24 hours. Each cached bean instance is therefore evaluated individually.) If so, then Block 730 purges the cached bean (in multiple tiers, if applicable). Block 735 then returns a null or negative result to the EM, and processing continues at Block 900 of FIG. 9. When Block 720 has a negative result (i.e. the criteria do not indicate that the bean instance is invalid), control transfers to Block 800 of FIG. 8.

When Block 715 has a negative result, then there is no cached bean instance in any of the tiers which matches the hash key value, and thus there is no cached instance that can be used to respond to the content request received at Block 500. Block 725 therefore returns a null or negative result to the EM, after which control transfers to Block 900 of FIG. 9.

Control reaches Block 800 when a previously-cached instance of a bean has been located in one of the storage tiers used by the caching system. Block 800 asks whether the located object was in the memory cache. If so, this cached instance is returned to the EM (Block 805). Otherwise, the located object is deserialized from the file system or database, and inserted into the memory cache using its corresponding hash key value (Block 810). (If the in-memory cache is full, one or more existing in-memory cached bean instances may be replaced prior to inserting the located object, e.g. by aging them out to the file system. A least-recently-used strategy may be used, as indicated in Block 810.) Control then transfers to Block 805, where the cached bean is returned to the EM. Following operation of Block 805, Block 815 sets the output properties of the bean which was instantiated (or reused) at Block 510 using the properties from this cached bean and returns control to the servlet corresponding to the invoked JSP. Processing of this invocation of the caching system then ends. Execution of the bean's business logic has been avoided through use of the cached bean instance, and the JSP will use the output properties of the cached bean in creating its response to the content request received at Block 500 (for example, by creating an output document where the values of the markup tags use the values of the bean's output properties).

Control reaches Block 900 of FIG. 9 when no previously-cached bean instance is available. At Block 900, the bean executes its business logic, which may include accessing one or more backend data stores as in the prior art, and the output properties of the bean are populated. The newly-generated output properties may then be made available for potential use in responding to a subsequent request for this bean's processing by storing the bean instance in the cache, according to the present invention, by invoking the "cacheMe" method on the bean (Block 905). Blocks 910 through 930 depict the logic used to implement this "cacheMe" method in the CS. At Block 910, the CS determines whether instances of this class should be cached. (As described with reference to Block 530 of FIG. 5, an administrator may be allowed to temporarily change the caching status of a class.) If the class instances are cachable, Block 915 determines the input properties which are used to distinguish instances of beans in this class, which may require executing a method or accessing a bean or class property as previously described, and then Block 920 computes a hash value on these input properties (and the property values) using the same hashing algorithm used by Block 705 of FIG. 7. At Block 925, the bean is stored in the in-memory cache using the hash value as a key. As indicated in Block 925, it may be preferable to store a clone of the bean, rather than the original bean, where a clone is the Java terminology for making an exact copy of an object. Saving the original bean is sufficient to prevent the system from garbage-collecting its storage and thereby destroying the computed information in the output properties. Saving a clone, on the other hand, has the advantage of preserving the computed properties as they exist following operation of the "execute" method and thereby protects the property values from subsequent changes that might occur, for example, if the remaining logic in the JSP were to invoke setter methods of the bean. (If necessary, one or more bean instances of the in-memory cache may be discarded first, as previously described.) If a database cache is used for centralized access to bean instances, then a serialized copy of the bean is also stored in the database by Block 925. If a file store cache is being used for redundant backup purposes, then a serialized copy of the bean may also be stored in the file system by Block 925 (although this has not been shown in FIG. 9). Control then returns (Block 930) to the servlet corresponding to the invoked JSP.

Block 940 is executed when the test at Block 910 has a negative result (i.e. when the CS test indicates that instances of this class should not be cached). In that case, control is returned to the servlet, which will then create the content response from the output properties which were set at Block 900.

Following completion of Block 930 or Block 940, the logic of the preferred embodiment of the present invention ends. Upon control returning to the servlet, the newly-set output properties (which are now also in the cached bean when Blocks 915–930 have been executed) are used by the servlet to fulfill the dynamically-generated content response, where the servlet remains unaware of whether the output properties came from a cached bean instance or have just been generated.

As has been demonstrated, the caching system provided according to this invention enables setting application-specific, developer-defined cache invalidation criteria that reduces system overhead and thereby improves system performance by caching dynamically generated content, while providing more accurate cached content than is available in prior art dynamic content caching systems.

While the preferred embodiment of the present invention has been described, additional variations and modifications in that embodiment may occur to those skilled in the art once they learn of the basic inventive concepts. The techniques disclosed herein are based partially upon certain predefined characteristics of the JavaBeans and JSP processing model. It will be obvious to one of ordinary skill in the art that the inventive concepts disclosed herein may be adapted to changes in these characteristics, should they occur. The inventive concepts may also be used with other processing models. Therefore, it is intended that the appended claims shall be construed to include both the preferred embodiment and all such variations and modifications as fall within the spirit and scope of the invention.

We claim:

1. A system for caching dynamically generated content, comprising:
   means for setting input properties of an object using input data values;
   means for executing a method of the object, after setting the input properties, thereby setting output properties of the object; and
   means for caching the object in a cache after executing the method and setting the output properties, wherein the input properties and the input data values are used to create a key to identify the object in the cache, thereby automatically distinguishing among versions of the object which result from executing the method using different input data values.

2. The system according to claim 1, wherein the object is a Java bean.

3. The system according to claim 2, wherein the input data values comprise one or more of: (1) a set of Hypertext Transfer Protocol (HTTP) parameters from a request for the output properties of the object; (2) session state information pertaining to the object; (3) context information pertaining to the object; and (4) information globally available to the means for executing.

4. The system according to claim 3, wherein the request is for a JavaServer Page.

5. The system according to claim 1, further comprising means for creating the key by sorting the input properties by property name, and concatenating the value of each input property to its sorted property name, wherein individual ones of the concatenated property name, value pairs are separated from one another with appropriate separators.

6. The system according to claim 1, wherein the means for executing the method further comprises means for accessing one or more data repositories to retrieve information used in setting the output properties.

7. The system according to claim 1, wherein the cached object is stored in an in-memory cache.

8. The system according to claim 7, further comprising means for using additional caching tiers beyond the in-memory cache, wherein the additional caching tiers comprise one or more of: (1) a file system, and (2) a database.

9. The system according to claim 8, wherein objects cached in the database are accessible to a plurality of servers.

10. The system according to claim 1, further comprising means for determining whether a selected object is not cachable, and for bypassing operation of the means for caching if so.

11. The system according to claim 1, wherein objects cached in the cache are accessible to a remote application.

12. The system according to claim 11, wherein the remote application accesses the cached objects using Remote Method Invocation (RMI) technology or CORBA (Common Object Request Broker Architecture) technology.

13. The system according to claim 1, wherein the request is for an Active Server Page.

14. The system according to claim 1, wherein the means for setting input properties and the means for executing the method operate responsive to receiving a request for the output properties of the object, when the object is not yet cached in the cache, and further comprising means for returning, to an issuer of the request, the output properties that have been set.

15. The system according to claim 1, further comprising:
   means for receiving a request for output properties of a particular object;
   means for creating a key for the particular object using the input properties and the input data values which are applicable for those input properties when the request is received; and
   means for using the key created for the particular object to determine whether the particular object is already available in the cache, and if so, returning, to an issuer of the request, the output properties from the cached particular object.

16. The system according to claim 1, further comprising:
   means for checking the cache, responsive to receiving a request for the output properties of a particular object, to see if an already-cached version thereof is available;
   means for handling a positive result of the means for checking, further comprising:
      means for returning, to an issuer of the request, the output properties from the already-cached version of the object; and
   means for handling a negative result of the means for checking, further comprising:
      means for activating operation of the means for setting input properties, the means for executing the method, and the means for caching, thereby creating a newly-cached version of the particular object; and
      means for returning, to the issuer of the request, the output properties from the newly-cached version of the object.

17. The system according to claim 16, wherein the means for checking the cache further comprises means for generating the key for the particular object by sorting the input properties by property name, and concatenating the value of each input property to its sorted property name, wherein individual ones of the concatenated property name, value pairs are separated from one another with appropriate separators.

18. A method of caching dynamically generated content, comprising steps of:
   setting input properties of an object using input data values;
   executing a method of the object, after setting the input properties, thereby setting output properties of the object; and
   caching the object in a cache after executing the method and setting the output properties, wherein the input properties and the input data values are used to create a key to identify the object in the cache, thereby automatically distinguishing among versions of the object which result from executing the method different input data values.

19. The method according to claim 18, wherein the object is a Java bean.

20. The method according to claim 19, wherein the input data values comprise one or more of: (1) a set of Hypertext Transfer Protocol (HTTP) parameters from a request for the output properties of the object; (2) session state information pertaining to the object; (3) context information pertaining to the object; and (4) information globally available to the executing step.

21. The method according to claim 20, wherein the request is for a JavaServer Page.

22. The method according to claim 18, further comprising the step of creating the key by sorting the input properties by property name, and concatenating the value of each input property to its sorted property name, wherein individual ones of the concatenated property name, value pairs are separated from one another with appropriate separators.

23. The method according to claim 18, wherein the executing step further comprises the step of accessing one or more data repositories to retrieve information used in setting the output properties.

24. The method according to claim 18, wherein the cached object is stored in an in-memory cache.

25. The method according to claim 24, further comprising the step of using additional caching tiers beyond the in-memory cache, wherein the additional caching tiers comprise one or more of: (1) a file system, and (2) a database.

26. The method according to claim 25, wherein objects cached in the database are accessible to a plurality of servers.

27. The method according to claim 18, further comprising the step of determining whether a selected object is not cachable, and for bypassing operation of the caching step if so.

28. The method according to claim 18, wherein objects cached in the cache are accessible to a remote application.

29. The method according to claim 24, wherein the remote application accesses the cached objects using Remote Method Invocation (RMI) technology or CORBA (Common Object Request Broker Architecture) technology.

30. The method according to claim 18, wherein the request is for an Active Server Page.

31. The method according to claim 18, wherein the step of setting input properties and the step of executing the method operate responsive to receiving a request for the output properties of the object, when the object is not yet cached in the cache, and further comprising the step of returning, to an issuer of the request the output properties that have been set.

32. The method according to claim 18, further comprising the steps of:
   receiving a request for output properties of a particular object;
   creating a key for the particular object using the input properties and the input data values which are applicable for those input properties when the request is received; and
   using the key created for the particular object to determine whether the particular object is already available in the cache, and if so, returning, to an issuer of the request, the output properties from the cached particular object.

33. The method according to claim 18, further comprising the steps of:
   checking the cache, responsive to receiving a request for the output properties of a particular object, to see if an already-cached version thereof is available;
   handling a positive result of the checking step, further comprising the step of:
      returning, to an issuer of the request, the output properties from the already-cached version of the object; and
   handling a negative result of the checking step, further comprising the steps of:
      activating operation of the setting input properties step, the executing the method step, and the caching step, thereby creating a newly-cached version of the particular object; and
      returning, to the issuer of the request, the output properties from the newly-cached version of the object.

34. The method according to claim 33, wherein the step of checking the cache further comprises the step of generating the key for the particular object by sorting the input properties by property name, and concatenating the value of each input property to its sorted property name, wherein individual ones of the concatenated property name, value pairs are separated from one another with appropriate separators.

35. A computer program product for caching dynamically generated content, the computer program product embodied on one or more computer-readable media and comprising:
   computer-readable program code means for setting input properties of an object using input data values;
   computer-readable program code means for executing a method of the object, after setting the input properties, thereby setting output properties of the object; and
   computer-readable program code means for caching the object in a cache after executing the method and setting the output properties, wherein the input properties and the input data values are used to create a key to identify the object in the cache, thereby automatically distinguishing among versions of the object which result from executing the method using different input data values.

36. The computer program product according to claim 35, wherein the object is a Java bean.

37. The computer program product according to claim 36, wherein the input data values comprise one or more of: (1) a set of Hypertext Transfer Protocol (HTTP) parameters from a request for the output properties of the object; (2) session state information pertaining to the object; (3) context information pertaining to the object; and (4) information globally available to the computer-readable program code means for executing.

38. The computer program product according to claim 37, wherein the request is for a JavaServer Page.

39. The computer program product according to claim 35, further comprising computer-readable program code means for creating the key by sorting the input properties by property name, and concatenating the value of each input property to its sorted property name, wherein individual ones of the concatenated property name, value pairs are separated from one another with appropriate separators.

40. The computer program product according to claim 35, wherein the computer-readable program code means for executing the method further comprises computer-readable program code means for accessing one or more data repositories to retrieve information used in setting the output properties.

41. The computer program product according to claim 35, wherein the cached object is stored in an in-memory cache.

42. The computer program product according to claim 41, further comprising computer-readable program code means for using additional caching tiers beyond the in-memory cache, wherein the additional caching tiers comprise one or more of: (1) a file system, and (2) a database.

43. The computer program product according to claim 42, wherein objects cached in the database are accessible to a plurality of servers.

44. The computer program product according to claim 35, further comprising computer-readable program code means for determining whether a selected object is not cachable, and for bypassing operation of the computer-readable program code means for caching if so.

45. The computer program product according to claim 35, wherein objects cached in the cache are accessible to a remote application.

46. The computer program product according to claim 45, wherein the remote application accesses cached objects using Remote Method Evocation (RMI) technology or CORBA (Common Object Request Broker Architecture) technology.

47. The computer program product according to claim 35, wherein the request is for an Active Server Page.

48. The computer program product according to claim 35, wherein the computer-readable program code means for setting input properties and the computer-readable program code means for executing the method operate responsive to receiving a request for the output properties of the object, when the object is not yet cached in the cache, and further comprising computer-readable program code means for returning, to an issuer of the request, the output properties that have been set.

49. The computer program product according to claim 35, further comprising:
  computer-readable program code means for receiving a request for output properties of a particular object;
  computer-readable program code means for creating a key for the particular object using the input properties and the input data values which are applicable for those input properties when the request is received; and
  computer-readable program code means for using the key created for the particular object to determine whether the particular object is already available in the cache, and if so, returning, to an issuer of the request, the output properties from the cached particular object.

50. The computer program product according to claim 35, further comprising:
  computer-readable program code mean for checking the cache, responsive to receiving a request for the output properties of a particular object, to see if an already-cached version thereof is available;
  computer-readable program code means for handling a positive result of the computer-readable program code means for checking, further comprising:
    computer-readable program code means for returning, to an issuer of the request, the output properties from the already-cached version of the object; and
  computer-readable program code means for handing a negative result of the computer-readable program code means for checking, further comprising:
    computer-readable program code means for activating operation of the computer-readable program code means for setting input properties, the computer-readable program code means for executing the method, and the computer-readable program code means for caching, thereby creating a newly-cached version of the particular object; and
    computer-readable program code means for returning, to the issuer of the request, the output properties from the newly-cached version of the object.

51. The computer program product according to claim 50, wherein the computer-readable program code means for checking the cache further comprises computer-readable program code means for generating the key for the particular object by sorting the input properties by property name, and concatenating said the value of each input property to its sorted property name, wherein individual ones of the concatenated property name, value pairs are separated from one another with appropriate separators.

* * * * *

UNITED STATES PATENT AND TRADEMARK OFFICE
CERTIFICATE OF CORRECTION

PATENT NO. : 6,757,708 B1
DATED : June 29, 2004
INVENTOR(S) : Craig et al.

It is certified that error appears in the above-identified patent and that said Letters Patent is hereby corrected as shown below:

Column 19,
Line 59, change "24" to read -- 28 --.

Column 20,
Line 3, change "request" to read -- request, --.

Column 21,
Line 38, before "cached" insert -- the --;
Line 39, change "Evocation" to read -- Invocation --.

Column 22,
Line 17, change "mean" to read -- means --;
Line 47, delete "said" from the text.

Signed and Sealed this

Twenty-second Day of March, 2005

JON W. DUDAS
*Director of the United States Patent and Trademark Office*